United States Patent [19]

Baliguet

[11] 4,127,812
[45] Nov. 28, 1978

[54] SELF-POWERED SYSTEM FOR MEASURING ROTATION SPEEDS

[75] Inventor: Michel P. Baliguet, Suresnes, France

[73] Assignee: Societe Nationale d'Etude et de Construction de Moteurs d'Aviation, Paris, France

[21] Appl. No.: 771,339

[22] Filed: Feb. 23, 1977

[30] Foreign Application Priority Data

Mar. 19, 1976 [FR] France .................................. 76 08622

[51] Int. Cl.² .............................................. G01P 3/48
[52] U.S. Cl. .................................................. 324/174
[58] Field of Search ............... 324/174, 173, 166, 78 J

[56] References Cited

U.S. PATENT DOCUMENTS

| 3,569,737 | 3/1971 | Bauer | 324/78 J X |
|---|---|---|---|
| 3,573,619 | 4/1971 | Ivec | 324/174 |
| 3,599,627 | 8/1971 | Millen | 324/78 J X |
| 3,826,985 | 7/1974 | Wiley | 324/123 |

Primary Examiner—Stanley T. Krawczewicz
Assistant Examiner—Vincent J. Sunderdick
Attorney, Agent, or Firm—Bacon & Thomas

[57] ABSTRACT

A tachometer comprises a pick-up for rotational speed of a phonic wheel and a magneto-electrical transducer and means for measuring the frequency of the alternating current which is delivered from the transducer. The tachometer comprises means for measuring the frequency and power supply means which are connected to the output of the transducer. Such a tachometer is useful as a control system for controlling the functioning of motors especially aeronautic motors.

5 Claims, 2 Drawing Figures

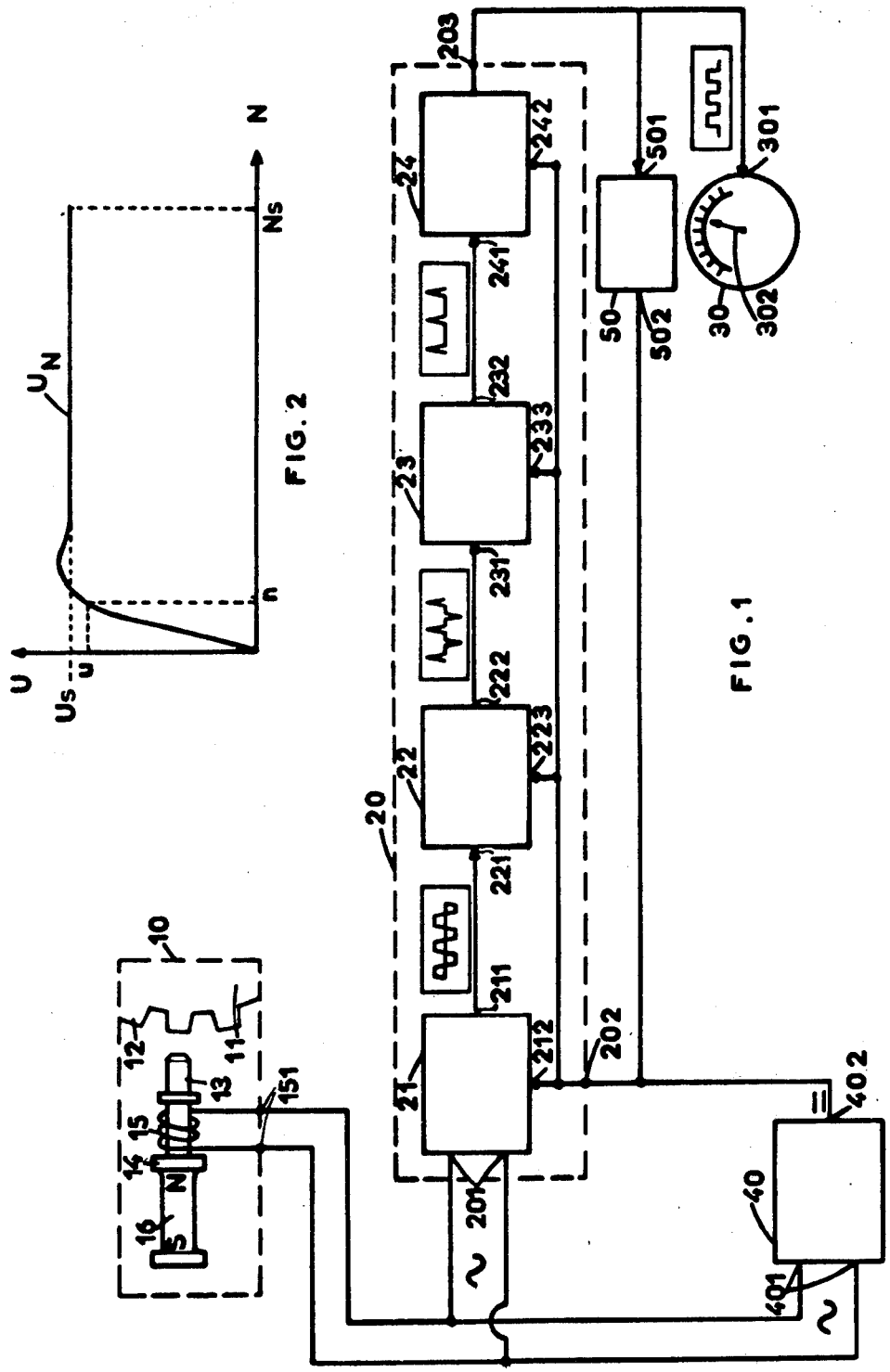

SELF-POWERED SYSTEM FOR MEASURING ROTATION SPEEDS

BACKGROUND OF THE INVENTION

The invention relates to a tachometer of the type which comprises a rotation pick up shaped as a phonic wheel, that is, a wheel having teeth of ferromagnetic material and which is connected to or forms part of the turning body which is the object that is to be measured tachometrically and which rotates adjacent a magnetic transducer. The frequency of the alternating current which is delivered by the transducer obviously is proportional to the rotation speed of the wheel as well as, in certain cases, the amplitude of the delivered voltage. Thus, the two electrical parameters of the rotation speed are determinable. Tachometers are already known which comprise phonic wheels which do measure the one or the other of these parameters.

Certain tachometers of the above-cited type of a first category measure the amplitude of the voltage from the transducer and the speed is indicated by a galvanometer which is graduated in units of rotation speed or frequency. These devices have the advantage that they do not need a source of current supply; yet their measurements contain errors which are due to the fact that the geometry of the pick up is not stable, variations of the air gap between the teeth and the magnetic pole, e.g. which are due to changes in the operating temperature and to structural deformations and which can only be compensated for by supplementary circuits which complicate the tachometric measurements.

Tachometers of the above-cited type of a secondary category which do measure the frequency comprise a frequency meter as a speed indicator. No doubt these devices are more precise and accurate than those of the previous category but those which are known require an external or autonomous source of current to feed the frequency meter.

As examples of prior devices see U.S. Pat. No. 3,826,985 and British Pat. No. 855,611.

SUMMARY OF THE INVENTION

The main object of the present invention is to provide a tachometer of the category which does not necessitate a current supply source, that is, a tachometer which provides the advantage of tachometers of both the previously mentioned categories at the same time. The invention is based on the fact that recent technological progress teaches the making of magnetic transducers with permanent magnets which have a considerably superior efficiency over previous transducers and the making of electronic circuits which consume very little electrical power.

The electromagnetic tachometers according to the present invention thus comprise a pick-up having a phonic wheel and at least one magneto-electrical transducer with a permanent magnet which is placed in proximity to the circumference of the phonic wheel and which by the passage of the teeth of the wheel is excited to deliver an alternating current for the tachometric measurement, the frequency of which is proportional to the rotational speed of the wheel; a conversion means which is equipped with an input for continuous current from a power supply and an input for the alternating current from the transducer and which is connected to the output of the transducer, and with an output which delivers a current the average amplitude of which is proportional to said frequency; a means for measuring said average amplitude, e.g. a galvanometer which is equipped with an input connected to said conversion means output; and finally, means which are equipped with an input for the alternating current and an output for direct current which is connected to the input for current in the conversion means. This tachometer is characterized by the fact that the input for alternating current from a supplying means is connected to the output of the transducer. Advantageously the tachometer comprises one single transducer to the output of which are parallelly connected the input for alternating current to the conversion means and the input for alternating current to the power supply.

BRIEF DESCRIPTION OF THE DRAWINGS

Further features and advantages of the invention will become apparent from the following description of an example of a tachometer according to an embodiment of the invention and which refers to the accompanying drawing wherein:

FIG. 1 is a schematic illustration in the form of block diagrams; and

FIG. 2 is a diagram of the characteristics of the pickup.

DESCRIPTION OF A PREFERRED EMBODIMENT

First, FIG. 1 is considered. FIG. 1 shows a tachometric pick-up 10, a conversion unit 20 for the current frequency, a galvanometer 30 and power unit 40.

The pick-up 10 comprises a phonic wheel 11 which is connected to a rotating body the angular speed of which is to be measured and which is not shown. The phonic wheel may itself be the element, the speed of which is to be measured, for example, a gear. The teeth 12 of the wheel 11 move past the finger 13 of a magneto-electrical transducer 14 of known structure but which will be briefly described. The finger 13 is surrounded by a winding 15. It elongates one of the poles, e.g., the north pole, of the permanent magnet 16. Thus, the winding 15 delivers from its output terminals 151 an alternating current which approximately corresponds to a sine curve, the frequency of which is equal to the product of rotational speed of the wheel, expressed in numbers of turns per second, multiplied by the number of teeth on the wheel.

In order to ensure a correct functioning of the tachometer in as broad a range of angular speeds as possible, it is preferred that the voltage which is delivered by the transducer stays practically stable within the entire range. This is achieved particularly by the size of the transducer (magnet pole pieces and the like) such that the field in the winding 15 is saturated as soon as the angular speed of the wheel 11 reaches the lower limit of the range to be measured. The diagram of FIG. 2 illustrates this condition. The rotation speeds N are noted at the abscissa and envelope of the peak voltages U at the transducer terminals 151 are noted at the ordinate axis. The magnet is shaped in such a way that the function $U_N$ reaches a value U equal e.g. to 90 or 95% of saturation value $U_S$ when the angular speed of wheel 11 reaches a value n which is equal to some percent of maximum value of $N_S$ of the range to be measured.

Returning to FIG. 1, it is seen that the terminals 151 of the output of the winding 15 are connected to the input terminals 201 of the conversion unit 20 and input terminals 401 of the power supply unit 40. The unit 40 contains circuits for rectifying and filtering which will not be described here since such circuits are well known to those skilled in the art. The stabilized direct current which is delivered from the output terminals 402 of the unit 40 is applied to the power supply inlet terminal 202 of the unit 20.

In order to simplify the figure, the earthing conductors of the circuits of the unit 20 are not shown. These comprise a clipping or voltage limiting circuit 21, a differentiating circuit 22, a detector circuit 23 and a monostable multivibrator 24. Along each of the connections which connect the different circuits, there is indicated the form of the signals which are fed from one to another. As far as the supply of direct current for said circuits is concerned, this is provided by their inputs 212, 223, 233 and 242 which are connected to the main input 202.

The clipping circuit 21 delivers signals of crenellated form from its output 211 to the input 221 of the differentiating circuit 22. The circuit 22 transforms these signals into alternatively positive and negative pulses corresponding to the positive and negative portions, respectively, of the clipped waves, and delivers these pulses from its output 222 to the input 231 of the detection circuit 23. The latter delivers only pulses of one single polarity from its output 232 to the input 241 of the monostable multivibrator 24. The recurrent frequency of those pulses is equal to the frequency of the alternating current which is delivered from the pick-up 10 to the terminals 201. From said pulses the monostable vibrator 24 delivers to the output 203 of the unit 20 crenellated pulses the size and the amplitude of which are calibrated and have the same recurrent frequency as the pulses which it receives.

The input 301 of the measuring means 30 thus receives a discontinuous signal the average strength of which is strictly proportional to the frequency of the current which is delivered from the pick-up 10. The measuring apparatus 30 can be simply a galvanometer with a movable component which integrates the delivered pulses from the output 203. If the internal resistance, towards the maximum deviation of the galvanometer, is very small with respect to internal impedance of the output of the unit 20, this unit plays the role of a frequency-current converter at constant voltage and the couple which acts on the needle 302 is in effect proportional to the number of ampere turns in the winding 15. The dial of the galvanometer 30 can then be graduated to give indications linearly related to the rotational speed of wheel 11.

In order to obtain an even better indication on the galvanometer 30, to the circuits of FIG. 1, a control current circuit may be of a known type which is not shown.

On FIG. 1 there is also shown a measuring means 50 with numerical calibration, the input 501 of which may e.g., be connected to the output 203 in parallel with the input 301. The means 50 may comprise e.g., a counter for pulses based on the time scale. This apparatus may be fed equally well from the power supply unit 40 from which it receives direct current at its input 502.

It is to be noted that the transducer of the pick-up 10 has an open magnetic circuit. A transducer with a closed magnetic circuit could very well be used but has the inconvenience of being bigger.

The tachometer according to the invention can be used in various control assemblies for rotating machines or motors which require high precision and a great functioning security especially with regard to supply failures.

The unit 20, the reading apparatus 30 and the power supply 40 are integrated in the same box of an instrument panel. The connection with the pick-up 10 is installed close to the rotating part and a simple 2-wire cable may be used. The service personnel are thus provided with a reliable precision control means which they can consult even in the case of a failure of circuits of the electrical supply.

I claim:

1. In a magneto-electrical tachometer having a rotation pick-up comprising a wheel having teeth of a ferromagnetic material adapted to be connected to a rotating body, the rotational speed of which is to be measured, at least one electromagnetic transducer with a permanent magnet adjacent the toothed circumference of the wheel and is actuated by the passage of the teeth of said wheel therepast to deliver an alternating electrical current, the frequency of which is proportional to the rotation speed of the wheel; a conversion means having an input for direct current from a power supply, an input for alternating current from said transducer, and an output which delivers a current, the average amplitude of which is proportional to said frequency; a measurement device for said average amplitude, the input of which is connected to said output; and power supplying means comprising rectifying and filtering means and having an input for alternating current for the power supply and an output for direct current connected to said conversion means; said tachometer being characterized by the input for alternating current for said power supplying means being connected directly to the output of said transducer.

2. Tachometer according to claim 1, which comprises one single transducer to the output of which are parallely connected the input for the alternating measurement current for the conversion means and the input for alternating supply current for the supplying means.

3. Tachometer according to claim 1, wherein the elements of the transducer, the output of which is connected to the input for alternating current from the supply means are dimensioned, taking into account the constituent material, such that it functions under saturated conditions when the rotational speed of the wheel reaches a predetermined value, whereby said transducer then delivers a voltage of a practically constant effective value within the whole range of speed which passes said predetermined value.

4. Tachometer according to claim 1, wherein the conversion means comprise a clipping circuit which is connected directly to the output of said transducer, differentiating and detector circuits for delivering pulses which have the same recurrent frequency as the frequency of the alternating current which is delivered from said transducer and a monostable multivibrator which produces from said pulses, crenellated pulses of calibrated size and amplitude.

5. Tachometer according to claim 4, wherein said measurement device includes visualizing means in the form of a galvanometer with a movable component of which the internal resistance at full deviation is negligible in relation to the impedance of the output of the conversion means, whereby the deviation of the component is proportional to the effective intensity of the signals which are delivered from said conversion means.

* * * * *